Sept. 10, 1963 A. V. FAGO 3,103,436

COLOR SEPARATION METHOD AND COMPOSITION FOR USE THEREIN

Filed June 24, 1958 2 Sheets-Sheet 1

INVENTOR.
ALFRED V. FAGO

BY Howard E. Thompson Jr

ATTORNEY

Sept. 10, 1963 A. V. FAGO 3,103,436

COLOR SEPARATION METHOD AND COMPOSITION FOR USE THEREIN

Filed June 24, 1958 2 Sheets-Sheet 2

INVENTOR.
ALFRED V. FAGO

BY Howard E. Thompson Jr

ATTORNEY

United States Patent Office 3,103,436 Patented Sept. 10, 1963

3,103,436

COLOR SEPARATION METHOD AND COMPOSITION FOR USE THEREIN

Alfred V. Fago, Butternut Court, Orange, Conn.

Filed June 24, 1958, Ser. No. 744,166
5 Claims. (Cl. 96—30)

Figure 1:
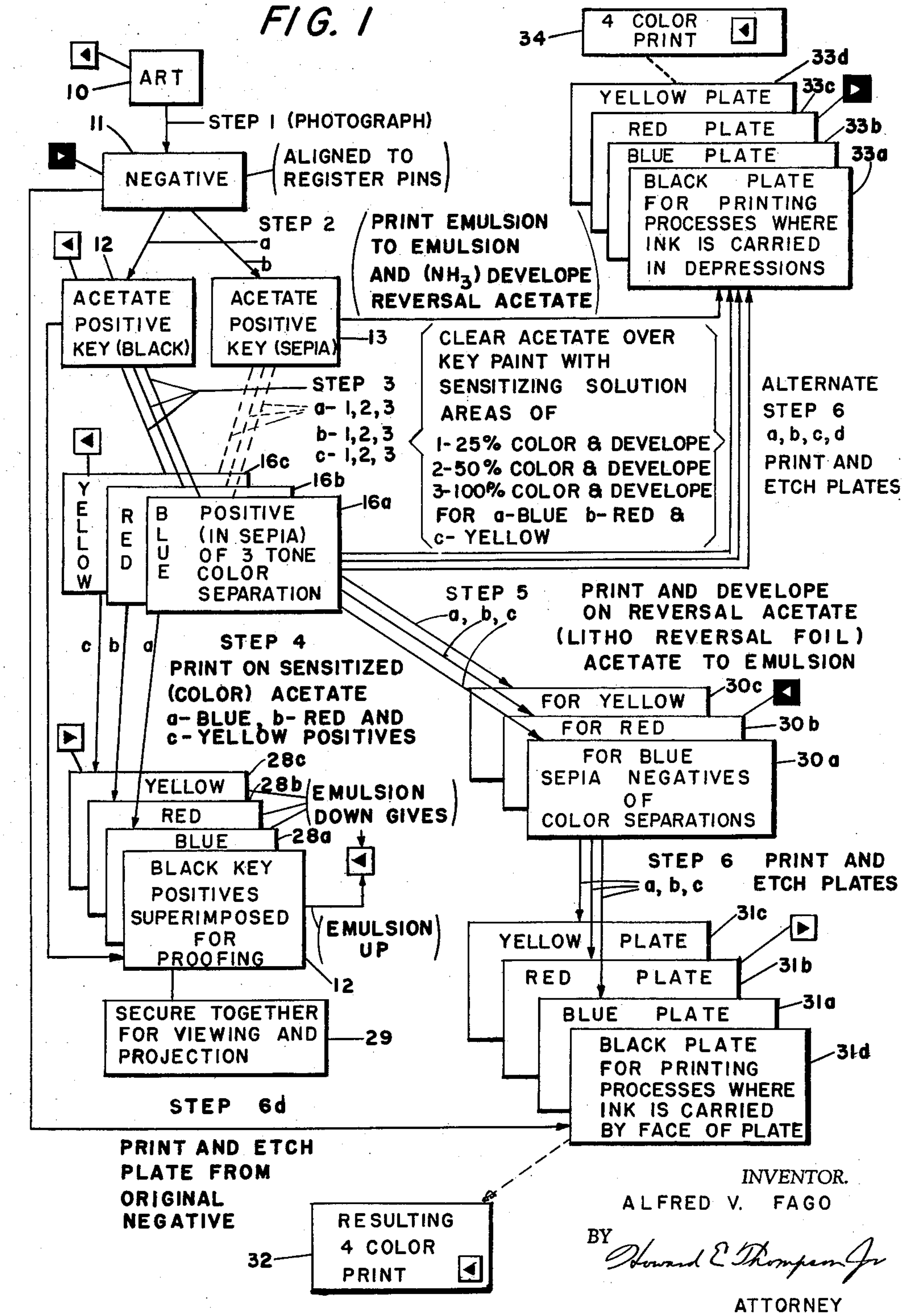

This invention relates to a new and improved method for making color separations usable in the production of printing plates, composite color transparencies, and the like. More particularly, the invention relates to a method for making color separations of the class described wherein photographic steps and wet processing are eliminated except for the production of an original master negative, and manipulative steps in making color separation plates carried out by an essentially dry process using special diazo acetate sensitized sheets with ammonia developing.

In many printing processes, the desired color effects in the reproduction of original art work are obtained by printing in four colors, namely black providing the basic outlines, and yellow, red and blue in various separate and overlapping combinations to approximate the colors and shades of color in the original art work. This general procedure requires the preparation of color separation negatives for use in etching the respective red, blue, and yellow printing plates. True color reproductions are, of course, prepared by photolithographic methods using special filters to obtain what might be termed "natural" color separations. In many instances, particularly in certain types of advertising, packaging, colored cartoons and comics, and the like, more practical and effective results are obtained using what might be termed "synthetic" color separation negatives. Customarily, each such "synthetic" color separation negative will have areas providing 100% color as well as screened areas providing 50% color, 25% color, or some other desired percentages of color including gradations of color, such fractional amounts of color or gradations thereof being provided by the use of different types of screens as commonly employed in the graphic arts.

Heretofore the preparation of such color separation negatives has involved a multiplicity of photographic steps, using wet processing of films with the troublesome problems of stretching and shrinkage, as well as the problems induced by air bubbles and similar imperfections in wet process emulsions requiring extensive time and work in proofing and repairing films in process.

Another approach to the preparation of color separation negatives utilized in recent years, involves the use of specially prepared boards or plates having a screened face treated so as to be activated with different solutions to bring out black images in the form of dots, lines, and solid areas (essentially depicting the desired arrangement of intensities desired for a particular color), separate boards of this type being prepared for each color to be used in printing. While this approach eliminates some of the problems in preparing color separation negatives, it is quite costly, involves extensive work under rather difficult conditions for those working with the specially treated boards, and has the further disadvantage of requiring the use of a true photographic step in order to prepare from the finished board a negative which can be utilized by the etcher in producing a printing plate for the particular color.

I have now discovered in accordance with the present invention a simplified method of preparing color separation negatives, and the like, which is both convenient and economical in practical use, and which overcomes the difficulties characteristic of methods previously employed, including in particular the difficulty in maintaining proper and accurate alignment of the images desired on the black, red, blue and yellow printing plates. The key to my new method involves the use, after preparation of an initial photographic negative from the original art work, of various diazo acetate films in all intervening steps of preparing and proofing color separation negatives. In some steps of the method, I use various commercially available diazo acetate films, including the standard films which develop to a sepia tone, which is strongly resistant to transmission of actinic light, and diazo acetate films in suitable colors, including black, red, blue, and yellow which are utilized in the method as hereinafter described.

In the actual preparation of the master color separation sheets, I employ clear acetate films to which a special sensitizing solution is applied on the localized areas which are to have similar color value. The sensitizing solution, which is similar to that used in the overall sensitizing of commercial diazo acetate films, dries rapidly, and application of localized deposits of such solution is continued until all areas of a film which are to have the same color value have been treated. To fix the desired image corresponding with such localized deposits the film is overlaid with a screen of the desired density and exposed to actinic light and then passed through an ammonia (vapor) developer to bring out in development, the predetermined pattern of color in the desired color intensity. When the predetermined sensitized pattern is to be developed for 100% color, the step of exposing to actinic light is eliminated, and the sensitized film is passed directly to the developer.

As a sensitizing solution I employ an organic solvent solution of active diazo compound and coupler which, when applied to clear acetate film or the like, will dry rapidly to a sensitized deposit inactivated by actinic light, and adapted upon ammonia developing to provide an adherent image which is resistant to actinic light. A suitable combination for this purpose is Diazo 69 (para-di-azo-diethyl-aniline-boro-fluoride) and Brown Coupler (resorcinol) which develope to a sepia image highly resistant to actinic light.

An effective sensitizing solution can be prepared by first mixing together about 30 cc. of isopropyl alcohol, 10 cc. of acetone and 0.2 gm. of citric acid and dissolving therein 3 gm. of Diazo 69; separately mixing together about 25 cc. of ethyl acetate, 25 cc. of Cellosolve, and 5 cc. of acetic acid and dissolving therein 1 gm. of Brown Coupler; and then mixing together the two solutions to form sensitizing solution ready for use.

This sensitizing solution is slightly yellowish or straw colored and can be readily brushed or otherwise applied to desired areas of acetate sheet or the like; however such application to predetermined areas of acetate sheet, as superimposed over a master positive print, is facilitated if a small amount of coloring agent is added, as for example 0.1 gm. of methylviolet in the above formulation.

For removing deposits of the sensitizing solution after drying, and either before or after developing, an aqueous solution of about 5% stannous chloride and 5% hydrochloric acid can be employed, thus facilitating the making of corrections when sensitizing solution has been inaccurately applied.

While for ease of description the films employed have been referred to as acetate and diazo acetate (sensitized) films, it is to be understood that the clear film per se can be any suitable transparent plastic, acetate (meaning cellulose acetate) merely being the most common and inexpensive form of film. Also, in place of applying sensitizing solution to untreated acetate film, it is within the scope of my invention to employ a treated or partially sensitized sheet which does not become fully sensitized until a complementary sensitizing agent is applied thereto. This approach can have the advantage of enabling the use of a complementary sensitizing agent which may flow more evenly, dry more rapidly, or otherwise enhance the manipulative steps of the method.

In the method, the original negative, and the black diazo acetate transparency prepared therefrom, are provided with a plurality of punched holes, establishing accurate alignment therebetween, and these punched holes cooperating with aligning pins, as hereinafter described, provide for accurate positioning and alignment of various acetate sheets as used throughout the process.

The method according to my invention, will be more readily understood from a consideration of the following description, taken together with the accompanying drawing in which FIG. 1 is a flow sheet indicating the steps involved; and FIGS. 2 to 8 are diagrammatic illustrations of certain steps of the method as shown in FIG. 1.

In the flow sheets, the small black on white, and white on black images adjacent the various items are intended to indicate the relative orientation and nature (whether positive or negative) of the images as seen in the various steps, and as viewed (except where otherwise noted) from the sensitized or emulsion side of the various films and the surfaces of the original art work, printing plates and resulting prints. The original art work 10 is photographed in the usual way in step 1 to provide a photographic negative 11 which may provide the actual size image desired in the final printing or some suitable enlargement thereof. In step 2, a photograph negative 11 is placed emulsion to emulsion against a reversal diazo acetate film 12 and printed and developed to provide a positive key (black) transparency as indicated by step 2*a*. Alternatively, or in addition thereto, as indicated in step 2*b*, a sepia tone positive transparency 13 can be prepared from the negative 11.

Figure 2:
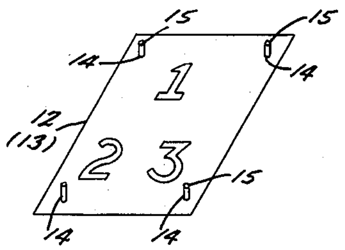

The key positive transparencies 12 and/or 13 are punched with a plurality of holes 14, preferably two or three at the top and two or three at the bottom, as shown in FIG. 2 of the drawing, to closely engage aligning pins 15 for positively positioning the key transparencies during later use.

Figure 3:
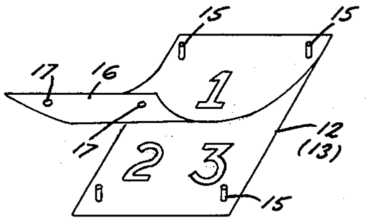
Figure 4:
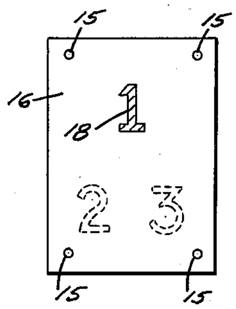
Figure 5:
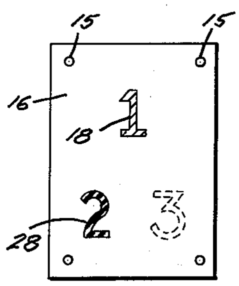
Figure 6:
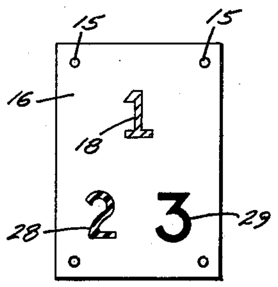
Figure 7:
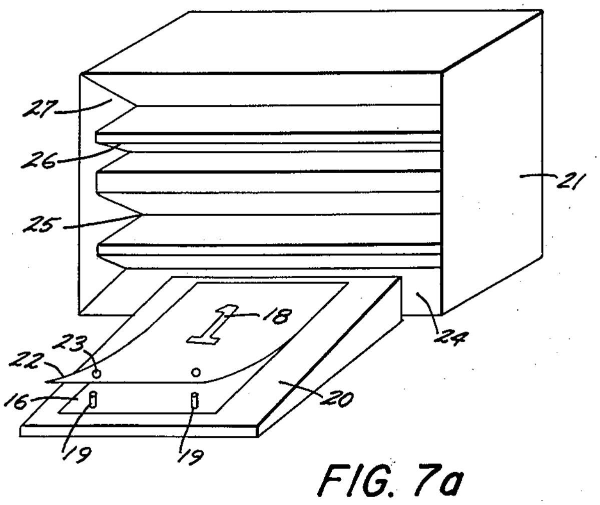
Figure 7A:
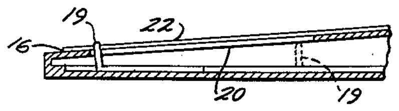

Step 3 of the method which really involves a plurality of repeated steps, will be briefly described in connection with a single step. A clear sheet of acetate 16, having holes 17 therein for engagement with pins 15, is placed over the key 12 or 13, as shown in FIG. 3 of the drawing. Assuming that the sheet 16 is to represent a blue color separation and the images 1, 2 and 3 on the key 12 or 13 are representative of all areas that are to be respectively in 25, 50 and 100% color intensity, the operator will first apply a deposit 18 of sensitizing solution to the clear acetate sheet 16 over the image 1, as shown in FIG. 4 of the drawing (doing nothing for the time being with respect to images 2 and 3 which appear dotted in FIG. 4 of the drawing). The acetate sheet 16 is removed from the pins 15 and engaged with corresponding movable pins 19 on a platen or support 20 for feeding through a printing and ammonia developing machine 21, as shown in FIG. 7 of the drawing, housing a source of actinic light. A screen 22, having apertures 23 for engagement with the pins 19, is placed (emulsion to emulsion) over the clear acetate sheet 16 with the deposit 18 thereon, this screen carrying uniform arrangements of dots, opaque to actinic light, covering 25% of the area to provide 25% color intensity in development of the sensitized area passing through the machine 21. The assembled sheets 16 and 22 while keyed to the pins 19 are advanced to the printing intake 24 where they are picked up by the usual feed belts and moved at a controlled speed through the machine. The sheets 16 and 22 when thus engaged by the machine would remain immovable with respect to each other, and as the assemblage advances, the pins 19 are disengaged from the sheets 16 and 22 as indicated in the dotted line position thereof in FIG. 7*a* of the drawing. The assemblage is delivered at the printing discharge 25 of the machine 21 at which point the parts 16 and 22 are separated and the sheet 16 alone is fed to the intake 26 with an ammonia developer unit and delivered at the discharge 27 thereof with the deposit 18 fixed as a screened (25%) image.

The steps in the preceding paragraph are repeated with the same acetate sheet 16 to sensitize, print, and develop all areas that are to be of 50% color intensity as represented by the deposit 28 applied over the numeral 2 (note FIG. 5 of the drawing), and fixed thereon in the manner described. These steps are again repeated with respect to areas on the sheet 16 which are to receive 100% color intensity as indicated by the deposit 29 applied over the numeral 3 (note FIG. 6 of the drawing), and fixed thereon in the manner described. When 100% color intensity is desired, the step of passing through the printing cycle (intake 24 and discharge 25) of the machine 21 is eliminated. On the other hand, if the available machine is one which conducts both printing and developing in a continuous fashion with initial pick-up before printing and delivery following development, then for development of areas of 100% color intensity a solid screen, opaque to actinic light, should be superimposed over the sensitized sheet 16 when passing same through such composite machine.

Figure 8:
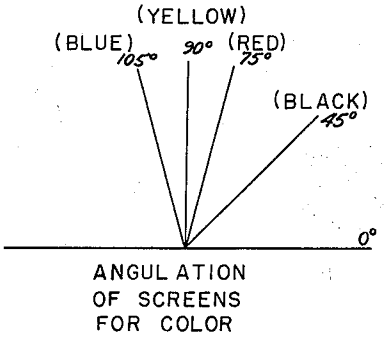

In order to provide proper blending of colors, the screens 22 employed for controlling the degree of color intensity in developing the images for different colors must be appropriately angled one with respect to the other. One such pattern for different angular arrangement of screens is shown in FIG. 8 of the drawing. Here it is indicated that screens for blue tones are arranged at 105° from the horizontal, those for yellow tones at 90°, those for red tones at 75°, and those for black tones, or grays at 45°. While these angular arrangements can be varied as a whole, the relative spacing or angular separation for the different colors should be rather carefully controlled as in all multi-color printing operations.

At this point we have carried the description through steps 3*a*–1, 2, and 3, as diagrammatically indicated in FIG. 1 of the drawing, and have an acetate sheet 16 with developed deposits thereon corresponding with the 25%, 50% and 100% blue color desired in the final printing. Steps 3*b*–1, 2 and 3, and steps 3*c*–1, 2 and 3, constitute repetitions of the steps previously described in connection respectively with the preparation of acetate sheets 16, carrying color intensity patterns for the red and the yellow images. The three complete transparencies having the color break-down are identified in FIG. 1 of the drawing as 16*a*, *b*, and *c*, respectively. It should be noted in this connection that if desired, a similar color separation in the grays can be made by using the key (sepia) positive 13, locally sensitizing, printing with the appropriate screen and developing as above described.

While the next step in the method, particularly when aimed at the production of printing plates for multi-color letter press printing, and the like, will be the preparation from transparencies 16*a*, *b*, and *c* of corresponding negative transparencies, it is generally preferable to check the accuracy of the color separations in the positive transparencies by running color proofs thereof. Thus in FIG. 1 of the drawing, step 4 indicates the printing of such proofs using sensitized diazo acetate film which develops to a particular color, blue, red, and yellow respectively. In steps 4*a*, *b*, and *c*, each of the positive (sepia) transparencies is placed emulsion to emulsion above the proper sensitized color acetate sheet, and passed through the developing machine 21 to first provide exposure to actinic light, and then effect ammonia development of the image. In this step the sensitized acetate sheets 28*a*, *b*, and *c*, are keyed to the positive transparencies 16*a*, *b*, and *c*, as fed to the machine 21 by means of the pins 19 as previously described. The developed positive color images are then superimposed and keyed with black acetate positive 12 providing a four-color transparency which can be readily checked with the original art work 10 for accuracy in the color separations. Furthermore, the four transparencies can be secured together as diagrammatically indicated at 29 in FIG. 1 of the drawing to provide a useful product per se, giving a four-color image either by through-viewing, or by projection. Such composite transparencies either as individual pictures, or as a series of pictures suited for motion picture projection, would find many applications in the entertainment, educational, and advertising fields.

Having checked the accuracy of the color separations (and made any corrections necessary thereon either by removing portions of the deposits on transparencies 16*a*, *b*, and *c*, or by sensitizing additional areas thereof and printing and developing with the proper screen 22) the positive transparencies 16*a*, *b*, and *c* are converted to negative (sepia) transparencies 30*a*, *b*, and *c* by printing on reversal acetate (lithoreversal foil) in an acetate to emulsion orientation. These steps, indicated in FIG. 1 as steps 5*a*, *b*, and *c*, are carried out in the machine 21, exposing first to actinic light and then developing the exposed reversal foil.

The resulting negative transparencies of the color separations are now ready to be used directly by an engraver, as indicated in steps 6*a*, *b*, and *c*, for printing on sensitized zinc plates, or the like, images which are developed and etched in the usual manner to form printing plates 31*a*, *b*, and *c*, adapted for use in all types of printing in which ink is carried by the face of the plate. Step 6*d* indicates the use of the original negative 11 in the printing and etching of the black plate 31*d* for use in such printing process. The resulting four-color print 32 will provide an accurate color reproduction of the original art work 10.

If it is desired that the black plate 31*d* also carry tones of gray for shading purposes which may not appear in the original negative, an acetate (sepia) positive 13 is treated as described in connection with step 3 to provide a positive (sepia) transparency of the gray color separations, and the resulting positive transparency is reversed to a negative transparency as described in connection with step 5, with the resulting negative transparency then being used in the printing and etching of the black plate 31*d*.

As previously mentioned for printing processes in which ink is carried by impressions in the printing plates (rather than by the face thereof), the method can be substantially shortened, since the positive transparencies 16*a*, *b*, and *c*, of the color separations, together with the key (sepia) positive 13 can be used directly in the printing and etching of plates for such printing process. In FIG. 1 of the drawing, this procedure has been indicated as alternate steps 6*a*, *b*, *c*, and *d*, providing printing plates 33*a*, *b*, *c*, and *d*, which will yield a four-color print 34 providing an accurate reproduction of the initial art work 10. Here again, if the black plate 33*a* is to have varying tones of gray, the key positive 13 would be carried through step 3, as above described, for the sensitizing and fixing of deposits corresponding with the different tones of gray desired.

It will be understood that in various uses and adaptations of the invention the principle of applying different color intensities progressively to a single sheet of transparent film can be advantageously employed even if a single color in different intensities is desired, or if several colors are desired with only one intensity of each color. The advantages of maintaining alignment in any such instances by the combination of utilizing a dry process and securing cooperating sheets accurately together by aligning means, such as the pins 15 and 19, in all steps of the method, make for superior results in printing operations, as well as in composite transparencies when utilizing the new method. At the same time, these advantages are accomplished at a very substantial reduction in the overall cost, and in the general simplification of preparation of color separation negatives.

The sensitizing solutions utilized in the local sensitizing of clear film as described in connection with step 3, which are suitably colored to facilitate accurate application by the operator, are considered to be new compositions forming part of the present invention. Likewise, the composite transparencies 29 when prepared by the method described are considered to be new and useful articles of commerce.

Various changes and modifications in the method and new compositions and products, as herein described will occur to those skilled in the art, and to the extent that such changes and modifications are embraced by the appended claims, it is to be understood that they constitute part of my invention.

I claim:

1. The color separation method that comprises superimposing a photographic negative of an original subject over a diazo sensitized film, exposing the assemblage to actinic light and developing by ammonia development a positive key transparency on said film, preparing from said positive key transparency a composite color separation for each color desired by a sequence of steps involving for each color: (1) arranging said positive transparency on mechanical aligning means, (2) superimposing thereon, engaged with said aligning means, a sheet of clear transparent film, (3) applying to said clear film over areas of the positive transparency which are to be of like intensity of the particular color, visible deposits of a diazo sensitizing agent which is inactivated by actinic light and adapted upon ammonia developing to form a fixed image opaque to actinic light, (4) removing said film from the registering means and assembling the same in proper angular alignment with a screen, opaque to actinic light and corresponding with the intensity of color desired, (5) exposing this assemblage to actinic light, (6) passing the film thus exposed to an ammonia developer to thereby fix a positive image for the color in the desired intensity, and repeating the sequence of steps 2 to 6 with the same clear film for each different intensity of the particular color required in said composite color separation, eliminating in the case of 100% color steps 4 and 5 above, said composite color separation being adapted for direct use by an engraver in making a color printing plate for printing processes in which ink is carried by depressions in the plate, and indirectly through transfer to reversal diazo sensitized film in making a color printing plate for printing processes in which ink is carried by the face of the plate.

2. A composition for brush application in the localized diazo sensitization of transparent film, said composition consisting essentially of an organic solvent solution containing active diazo compound and coupler which prior to ammonia development are inactivated by actinic light, and which are fixed by ammonia development to provide a deposit opaque to actinic light, organic solvents in said solution all boiling below about 135° and being predominately a mixture of isopropanol and lower boiling solvents whereby said composition is sufficiently volatile to rapidly air-dry at atmospheric conditions to an adherent deposit when brush applied to such film, and said organic solvent solution further containing a substance imparting readily visible color thereto facilitating visual identification of areas of film to which said composition is applied, said substance being transparent to actinic light.

3. A composition as defined in claim 2 wherein the diazo compound and coupler are respectively about 3 grams of para-diazo-diethyl-aniline-boro-fluoride and 1 gram of resorcinol in about 95 cc. of organic solvents and are fixed by ammonia development to a sepia deposit highly opaque to actinic light, and the substance imparting visible color to said composition is about 0.1 gm. of methylviolet.

4. The method of preparing a color separation transparency adapted for direct use in photoengraving of printing plates that comprises superimposing a clear transparent film over a master sheet, locating predetermined areas having varied color value, brush applying to those portions of the transparent film which overlie areas having a common color and intensity of such color a rapidly drying composition providing visible deposits of a diazo sensitizing agent which is inactivated by actinic light and adapted upon ammonia developing to form a fixed image opaque to actinic light, inactivating portions of such deposits if said areas of common color are characterized by less than 100% intensity of the particular color by superimposing over said film with senitizing agent deposited thereon a screen, the pattern of which is opaque to actinic light and characteristic of the desired color intensity, and exposing the assemblage to actinic light to thereby inactivate portions of such deposits which are not covered by opaque portions of said screen, and then passing the film with such deposits thereon to an ammonia developer to thereby fix said deposits as images opaque to actinic light.

5. The method as defined in claim 4 wherein the procedure is repeated using screens of different intensity over successively sensitized deposits on said film to provide on said film a pattern of different type deposits opaque to actinic light representing the range of intensities of a color desired in reproducing a variegated image.

References Cited in the file of this patent

UNITED STATES PATENTS

| | | |
|---|---|---|
| 833,448 | Vall et al. | Oct. 16, 1906 |
| 1,614,924 | Hutchison | Jan. 18, 1927 |
| 2,020,688 | Kronschnabl | May 12, 1935 |
| 2,051,582 | Von der Gritten | Aug. 18, 1936 |
| 2,246,425 | Poser et al. | June 17, 1941 |
| 2,273,568 | Fishel | Feb. 17, 1942 |
| 2,602,741 | Von der Gritten | July 8, 1952 |
| 2,613,149 | Unkauf | Oct. 7, 1952 |
| 2,790,715 | Papadakis | Apr. 30, 1957 |
| 2,841,493 | Carranza | July 1, 1958 |

FOREIGN PATENTS

| | | |
|---|---|---|
| 17,638 | Great Britain | Aug. 16, 1906 |